United States Patent [19]

Randolph

[11] 3,977,262

[45] Aug. 31, 1976

[54] DRIVE MECHANISM FOR A CARRIAGE

[75] Inventor: John E. Randolph, Palatine, Ill.

[73] Assignee: Teletype Corporation, Skokie, Ill.

[22] Filed: Jan. 15, 1975

[21] Appl. No.: 541,362

[52] U.S. Cl. ............................ 74/89.15; 74/424.8 R
[51] Int. Cl.² ........................................ F16H 27/02
[58] Field of Search ............... 74/424.8 R, 424.8 A, 74/59.15

[56] References Cited
UNITED STATES PATENTS

| | | | |
|---|---|---|---|
| 2,555,124 | 5/1951 | Gothberg | 74/424.8 R |
| 2,838,948 | 6/1958 | Lassy | 74/424.8 A |
| 2,876,653 | 3/1959 | Meyer | 74/424.8 R |
| 3,106,352 | 10/1963 | Bennett | 74/424.8 R |
| 3,353,718 | 11/1967 | McLay | 74/424.8 R |
| 3,698,257 | 10/1972 | Ballentine et al. | 74/424.8 R |

Primary Examiner—Samuel Scott
Assistant Examiner—Wesley S. Ratliff, Jr.
Attorney, Agent, or Firm—J. D. Kaufmann; J. L. Landis

[57] ABSTRACT

A drive mechanism includes a nut on a rotatable lead screw. The nut has a partially threaded and partially unthreaded axial bore and a mounting assembly to couple it to a linearly movable carriage. The mounting assembly includes diametrically opposed carriage-engaging lugs positioned on the drive nut near the threaded bore end and a locking arm slidably keyed into a slot in the carriage which mounts the drive nut for universal radial floating on the carriage. The drive nut may become slightly skewed relative to the axis of the lead screw in order to minimize frictional forces due to tolerance variations, bow in the lead screw, or axial misalignment of the lead screw with carriage guide rods. Kinetic-energy-induced bounce forces of the carriage are damped by a coil spring which also maintains the lugs against the carriage.

16 Claims, 5 Drawing Figures

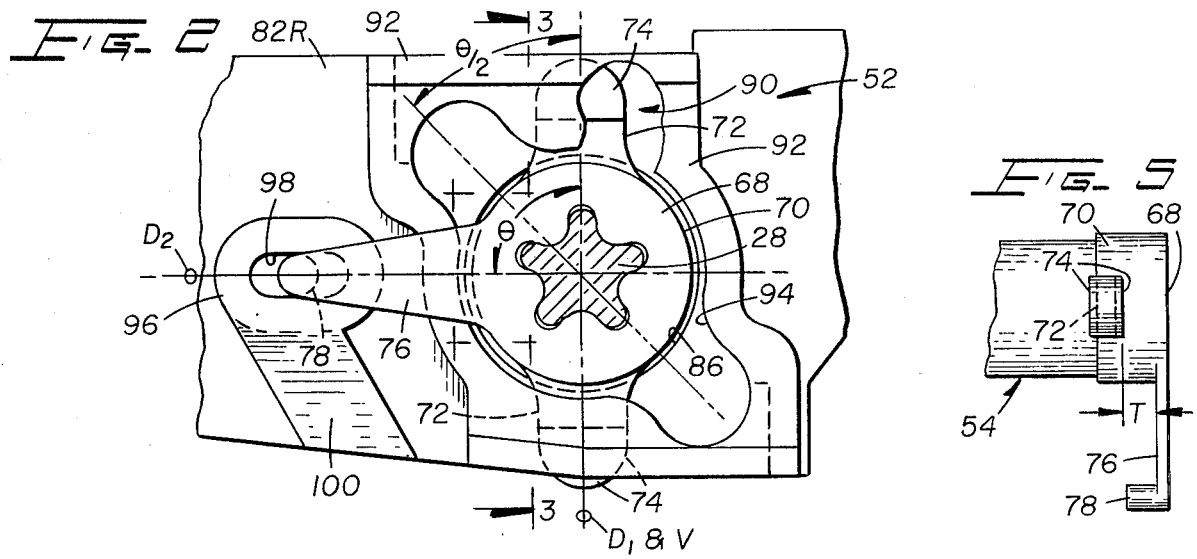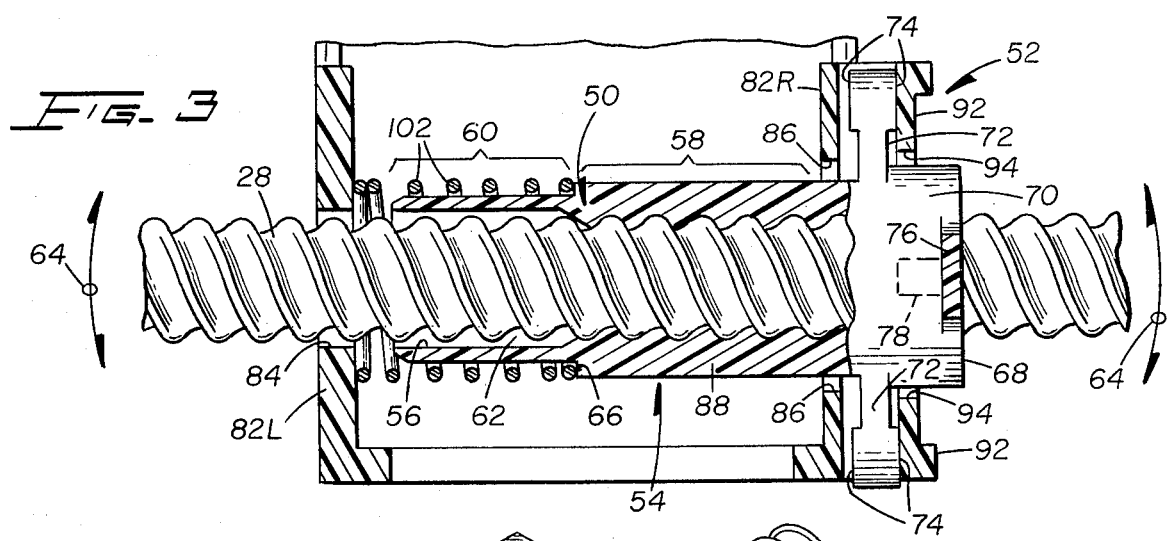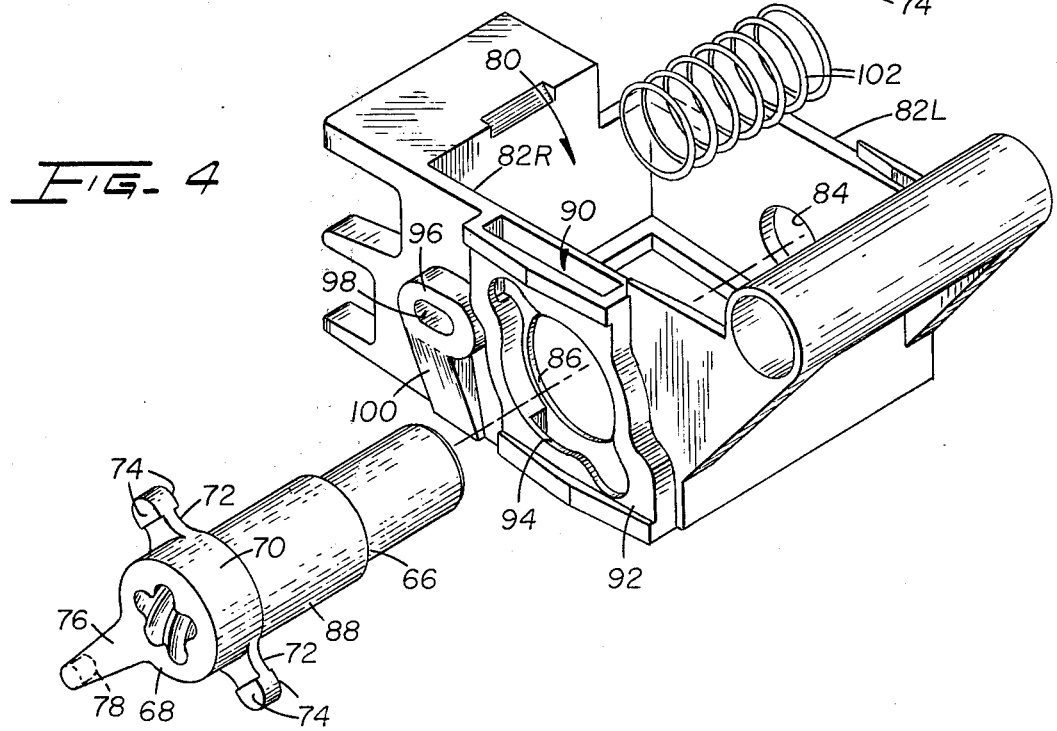

DRIVE MECHANISM FOR A CARRIAGE

BACKGROUND OF THE INVENTION

1. Field of the Invention

The present invention relates to a drive mechanism for a carriage, and, more particularly, to both a lead-screw-driven drive nut mountable on a carriage for universal floating thereon and the assembly of such a drive nut and the carriage.

2. Description of the Prior Art

Some devices, such as certain types of printers, have reciprocally lead-screw-driven carriages. In such a printer, the direction of carriage motion is back-and-forth across a record, such as a paper sheet, on which printing takes place by the operation of a print head on the carriage. The paper may be drawn over a rotatable platen by either frictional engagement therewith or by engagement of the paper with an associated sprocket wheel. Rotation of the platen to effect controlled line feed advancement of the paper may be achieved by the line feed mechanism of commonly-assigned, copending application of Ingard B. Hodne, Ser. No. 468,048, filed May 8, 1974 and incorporated by reference hereinto.

The carriage may move along one or more guide rods parallel to the lead screw. The carriage and the print head are coupled to the rotatable lead screw by a threaded member, or drive nut, mounted thereon.

Typically, the lead screw is driven by a reversible stepping motor, the rotational movement of the lead screw being translated by the drive nut into linear reciprocal movement of the carriage and the print head. The optical sensor of commonly-assigned, copending application of R. E. LaSpesa, Ser. No. 468,049 filed May 8, 1974 and incorporated herein by reference may be utilized to synchronize carriage position and printer operation with the rotation of the stepping motor.

Lead-screw-driven carriages are typically employed in high speed printers of the dot matrix type wherein wires are selectively "fired" or driven toward the paper to effect printing. Two illustrative printers of the dot matrix type are disclosed in the commonly assigned copending applications of J. L. DeBoo et al., Ser. No. 468,046, filed May 8, 1974 and of J. A. Bellino et al., Ser. No. 512,264, filed Oct. 4, 1974, both incorporated by reference hereinto.

While lead screw drives are generally simpler, more rugged and cheaper than belt or chain drives, they present a number of problems. These problems and some of the prior art solutions thereof are discussed in the commonly assigned, copending application of A. F. Lindberg, Ser. No. 468,047, filed May 8, 1974 and incorporated herein by reference. See also U.S. Pat. No. 3,656,358. A precis of these problems follow.

Because both the lead screw and the drive nut are threaded, unless stringent tolerances are adhered to in the manufacture thereof either some backlash (i.e., spacing between the interfitted screw and nut threads) must be tolerated, or a tight-fitting drive nut must be employed.

Attempts to manufacture the lead screw and drive nut to stringent tolerances, i.e., less than ± 0.0015 inches, have proven to be impractical for a number of reasons, first, the lead screw extends across the entire width of the printer parallel to the platen. Thus, there is always a tendency for the lead screw to develop a slight bow which is most pronounced along the intermediate region thereof. Second, while the lead screw is normally mounted in precision bearings, tolerance variations in the bearing mountings usually lead to misalignment between the lead screw and carriage guide rods. Third, because of the size of the threads and the length of the lead screw, formation of the threads by precision machining, as distinguished from conventional (and not so precise) cold rolling, is prohibitive from a cost standpoint.

Accordingly, even if a drive nut could be manufactured to accurately engage the lead screw with a very close fit, having negligible backlash, very high frictional forces develop not only between the lead screw and drive nut, but also between the carriage and the guide rods. Such frictional forces lead to excessive wear of the mating parts generating them, and may overcome the driving torque of the stepping motor, in which case, the carriage binds on the guide rods. Such a condition, of course, may seriously damage the stepping motor.

Equally important is the fact that any non-uniform frictional forces, whether or not great enough to actually bind the carriage, vary the speed at which the carriage is moved along the guide rods. Such unintended variations in carriage speed during printing cannot be tolerated in high speed dot matrix printers, because there must be a very precisely correlated relationship between the firing of the print wires and the position of the print head.

In an attempt to solve some of the foregoing problems, drive nuts have been proposed wherein the central bore is threaded along its entire axial length, but with one end region thereof formed with a circumferentially spaced array of slits to produce a plurality of internally threaded, cantilevered resilient fingers. One or more so-called garter springs may be mounted on the fingers to augment the compressive forces of the resilient fingers on the threads of the lead screw. See U.S. Pat. No. 3,656,358.

In still another design, a drive nut is formed with an intermediate thin wall section having a circumferential array of longitudinally disposed slits formed therein and an end section that is slightly tapered. This design allows a variable degree of expansion of the drive nut body over an appreciable portion of the axial length thereof.

In these drive nut designs, the central bore is threaded along its entire length, which prevents the drive nut from being slightly tilted or skewed relative to the axis of the lead screw. Such tilt or skew is often desirable to compensate for bow in the lead screw, as well as for any misalignment thereof relative to the carriage guide rods.

Another approach to the problem of minimizing frictional forces between a drive nut and a lead screw has been to purposely build-in a predetermined degree of backlash therebetween. Prior backlash-containing drive nuts are typically elongated, solid wall, tubular members with a threaded bore extending along the entire axial length thereof. Such a construction prevents any appreciable tilting or skewing of the drive nut relative to the axis of the lead screw.

When a built-in degree of backlash is employed in a lead screw-driven drive nut a substantial degree of kinetic energy is established by movement of the mass of the coupled carriage, together with any associated apparatus carried thereby, such as the print head. Such kinetic energy can establish large, initial impact forces, as well as transient forces, between the lead screw and drive nut threads if not compensated for or absorbed in some way. These forces, may lead to "bouncing" of the carriage (and print head) which has proven to be particularly troublesome in lead screw driven printers where the carriage is moved from one character print column position to the next across the width of the platen in step-by-step fashion.

In the above-noted Lindberg application there is disclosed a lead screw-driven drive nut which solves many of the above prior art problems. The drive nut has an axial bore which is threaded for approximately one-half of its length, and which is unthreaded along the remaining half of the bore. An annular clearance space is established between the unthreaded portion wall of the bore and an associated lead screw passing there-through, which space allows the drive nut to acquire a slightly tilted or skewed orientation, relative to the axis of the lead screw. A resilient mounting assembly for the drive nut includes a specially constructed resilient O-ring which is coaxially positioned on the drive nut near the unthreaded end thereof and, in combination with a pair of adjustable O-ring clamping plates, resiliently mounts the drive nut in a cantilevered manner on an apertured side wall of the carriage through which the lead screw passes. The drive nut may be slightly skewed or tilted relative to the axis of the lead screw, while still minimizing any relative axial and/or radial displacement therebetween. With the drive nut threads additionally dimensioned so as to establish a predetermined degree of backlash when mounted on the lead screw, the drive nut-carriage assembly readily compensates for both tolerance variations in the lead screw threads, and any bow therein, as well as any lack of parallelism between the lead screw and the guide rods of the carriage. The O-ring may be made of a viscoelastic material, such as a polyester base urethane, so that any kinetic energy-imparted bounce forces that are established by the carriage due to backlash (whether predetermined or otherwise) are substantially, if not completely, absorbed by the O-ring, and dissipated thereby in the form of heat.

The drive mechanism of the present invention is a simplified alternative to, and an improvement of, the drive nut of the above-noted Lindberg application. It avoids the problems of the prior art, as will be subsequently appreciated, and is simpler and cheaper to make, install and maintain, than the Lindberg drive nut.

It is therefore an object of the present invention to provide a new and improved drive mechanism for a carriage.

Yet another object of the present invention is to provide a new and improved drive mechanism including a lead-screw-driven drive nut on a carriage for universal floating thereon.

Another object of the present invention is the provision of a drive mechanism including a drive nut which is mounted to both a lead screw and to a movable carriage for reciprocating the carriage upon rotation of the lead screw in a manner such that bow in the lead screw and movement of the carriage other than parallel to the lead screw are compensated for to minimize excessive wear of the lead screw and the drive nut.

Another object of the present invention is the provision of a new and improved drive mechanism including a drive nut for a lead-screw-driven carriage wherein the nut is free to float in a direction at right angles to the direction of movement of the carriage and to the axis of the lead screw to compensate for alignment errors and to exert forces on the carriage due to rotation of lead screw only substantially parallel to both the axis of the lead screw and the direction of movement of the carriage.

Another object of the present invention is the provision of a new and improved drive mechanism including a drive nut for a lead-screw-driven carriage which obviates the difficulties of the prior art.

SUMMARY OF THE INVENTION

With these and other objects in view the present invention contemplates a new and improved drive mechanism. The mechanism has a drive nut designed to be threaded onto a lead screw and coupled to a carriage for converting rotary motion of the lead screw into reciprocatory motion of the carriage. The drive nut comprises a tubular member having a central bore therethrough, part of the bore being threaded, to interfit with the lead screw, and part of the bore being unthreaded. The unthreaded portion of the bore is sufficiently large to provide a predetermined amount of clearance between the threads on the lead screw and the wall thereof so that skewing of the nut may occur. The drive nut is mounted to the carriage by a pair of diametrically opposed projections on the exterior of the nut near the end of the threaded bore, which projections are aligned with a diameter of the nut. The projections are maintained in a chamber on the carriage to permit the drive nut to universally float, that is, to move in any direction at right angles to both the axis of the lead screw and the direction of movement of the carriage. The drive nut is prevented from rotation after being mounted to the carriage by an arm which is slidably held on the carriage as a slidable pivot point for the floating of the drive nut.

BRIEF DESCRIPTION OF THE DRAWINGS

The present invention is described with respect to the following drawings in which:

FIG. 2 is an enlarged end view partially in cross section taken along line 2—2 of FIG. 1 showing a drive nut of the present invention and the configuration of the carriage to which the drive nut is mounted which permits the effectuation of the desirable ends of the present invention;

FIG. 3 is an enlarged fragmentary cross sectional detailed view taken longitudinally along line 3—3 of FIG. 2 showing details of the drive nut of the present invention; and FIG. 4 is an exploded view of the drive nut of the present invention showing the method of assembly thereof to a movable carriage;

FIG. 5 is a side view of the drive nut showing the offset between the arm and the lug.

DETAILED DESCRIPTION OF THE INVENTION

Figure 1:
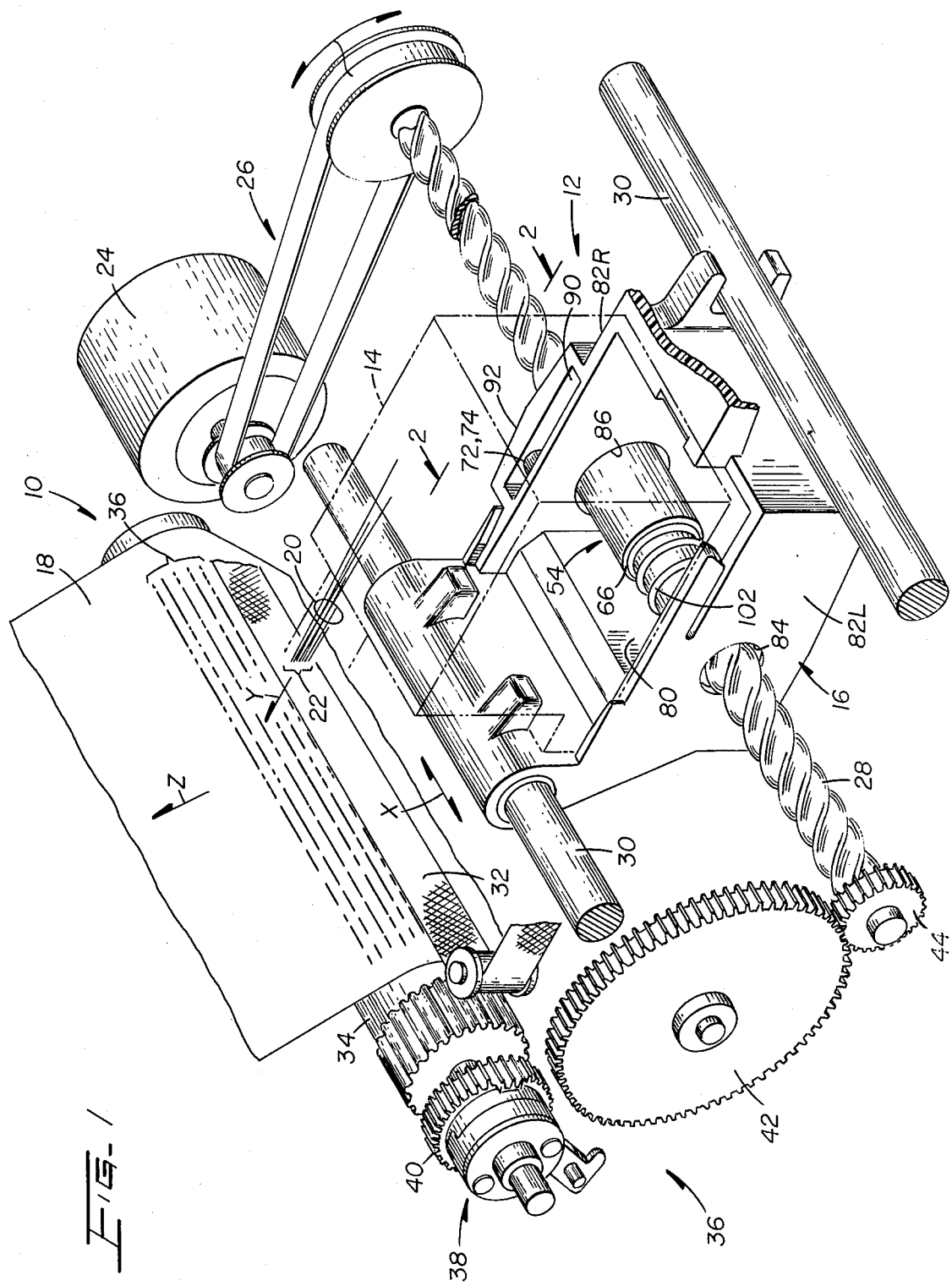
FIG. 1 is a partially broken-away, perspective view of a high speed, dot matrix printer with some parts being omitted for the purposes of illustrating the drive mechanism of the present invention.

As mentioned above, the present invention may find general application in any lead-screw-driven device. For purposes of illustration however, the drive mechanism of the present invention is disclosed in connection with a high speed dot matrix printer 10 of the type depicted generally in FIG. 1. Except for the drive mechanism generally designated 12 in FIG. 1, other details of the printer structure may be the same as those disclosed in either the aforementioned application of J. L. DeBoo et al. or of J. A. Bellino et al.

A print head 14 (shown in partial phantom) which may be that of either the above-noted DeBoo or Bellino applications is mounted on a carriage 16 for linear traversing movement in a horizontal direction (designated X) across a record medium such as a paper 18 on which printing or other marking or punching is to take place. As viewed in FIG. 1 the print head 14 travels from left to right during printing, similar to certain conventional typewriters, and then returns from the right to the left after each line has been printed on the paper 18.

The print head 14 includes a plurality of print wires 20, seven being illustrated in FIG. 1 for a conventional 5 × 7 dot matrix. Printing ends 22 of the print wires 20 are equally spaced vertically to print successive vertical columns of dots on the paper 18 as necessary to form selected alpha-numeric characters or other information or data thereon. As is well known in the matrix printer art, the print wires 20 are selectively actuated as the head 14 traverses the paper 18 to form the characters via a matrix of the dots. When the head 14 contains a single column of seven print wires 20 the traversal of the carriage 16 and the head 14 provides the X dimension of the 5 × 7 dot matrix, while the vertical print wires spacing provides the X (height or vertical) dimension of the characters. If lower case letters are to be printed, or if other more complex characters or patterns are to be formed, then a 7 × 9 or even larger matrix may be used, for example by adding two or more print wires to the wires 20 of the print head 14.

The carriage 16 continuously traverses the paper 18 in the X direction by a reversible drive motor 24 which may turn a belt and pulley transmission 26 to rotate a conventional helical lead screw 28 on which the carriage 16 is threadedly mounted by the drive nut assembly. Alternatively, the carriage 16 may be driven in step-by-step fashion across the paper 18 with the print head 14 stopping at each possible printing column during its traversal across the paper 18.

The carriage 16 is mounted for linear reciprocation in the X direction on a pair of guide rods 30 and is reciprocated by the drive motor 24 between the left hand start-of-line and the right hand end-of-line positions in a generally conventional fashion. In order to permit either the continuous or the step-by-step mode of operations, and to facilitate return of the carriage 16 to the start-of-line position, the drive motor 24 is usually a stepping motor which may be operated in a stepping mode or a slewing mode. The drive nut assembly 12 may be of the type described in the aforementioned Lindberg application, or, preferably, may be that disclosed in the present application.

As the print head 14 travels across the paper 18 in the X or printing direction past each possible printing position, selected ones of the print wires 20 are "fired" or actuated "on-the-fly" to print a column of from zero to seven dots. The firing of a wire 20 is accomplished by driving the wire a short distance in the horizontal direction Y which is perpendicular to both X and Z and to the paper 18 to impact the printing end 22 of the wire 20 against a type ribbon 32 which drives the ribbon 32 and the adjacent portion of the paper 18 against platen 34 in a well-known manner.

When a desired length of a line 36 of characters has been printed, or when the end-of-line position is reached, the carriage 16 is returned to the start-of-line position and the paper 18 is stepped upwardly one or more character lines in the Z direction as in a conventional typewriter. Preferably, this is done automatically by a line feed mechanism 36 in preparation for the printing of following lines. While any known line feed mechanism 36 may be used in accordance with the present invention, one preferred mechanism is that set forth in the application of Hodne, noted above. Generally, the line feed mechanism 36 includes a coupling or clutch 38 responsive to a line feed signal to position a platen gear 40 in mesh with a speed reduction gear 42 for a preset time interval during carriage return from the end-of-line position to the start-of-line position to rotate the platen 34 and to step the paper 18. The gear 42 in turn is driven by drive gear 44 mounted on the lead screw 28 as shown in FIG. 1.

Various other arrangements for effecting relative movement of the print head 14 and the paper 18 may be utilized. For example, in printing the lines 36 of characters, the platen 34 may be rotated and the paper 18 stepped the desired number of lines at the end-of-line position of the head 14, and the next line 36 may be printed on the return stroke while the carriage 16 is moving back to the start-of-line position. Moreover, to print graphs or patterns, generally referred to as "plotting", the platen 34 may be "rolled" independently of the movement of the carriaage 16 by appropriate incoming data signals via circuitry (not shown) connected to the drive motor 24 to provide a variable dimension to the graph or pattern. Moreover, the carriage 16 may be independently movable by a "slide-on-slide" arrangement such as by using a linear electric motor of the type shown in A. G. Wallskog U.S. Pat. No. 3,696,204 or G. Cless U.S. Pat. No. 3,688,035. Other details of the carriage 16 and other portions of general printing mechanisms and operating circuits are not critical to the present invention.

In the above-noted commonly assigned application of LaSpesa there is disclosed an optical sensor for generating timing pulses to synchronize printer operation in response to a code wheel mounted on the shaft of the drive motor 24 and a mechanism for precisely setting the angular position of the sensor with respect to the code wheel. Such a sensor may also be utilized with the present invention in a high speed dot matrix printer.

DRIVE NUT

Turning now to FIGS. 1–4, the structure of the drive mechanism 12 of the present invention and its relationship to the reciprocable carriage 16 are explained and described in greater detail.

The drive mechanism 12 comprises a drive nut 50 and mounting facilities 52 on the carriage 16.

The drive nut 50 comprises tubular, cylindrical, elongated body 54 having a central coaxial bore 56 through the entire length thereof. One portion 58 of the bore 56 is threaded. The threads are designed to interfit with corresponding threads on the lead screw 28. As is well known, a predetermined amount of backlash may be present at the interface between the threads of the 28 lead screw and the threads of the portion 58. Specifically, there may be a space present between the threads of the threaded portion 58 and the threads on the lead screw 36. This space is explained, and is shown quite clearly, in FIG. 3 of the aforementioned Lindberg application and is designated 59 in that application. Because of the advantageous characteristics of the drive nut assembly 12 of the present invention, it is preferred that the threads on the lead screw 28 and portion 58 of the drive nut 50 be so formed that there is little if any predetermined backlash present. Specifically, the structure of the present drive mechanism 12 permits the interfitting threads to be formed within a tolerance of ± 0.0015 inches that is, substantially without backlash.

Another portion 60 of the bore 56 is unthreaded. The diameter of this unthreaded portion 60 is such that when the drive nut 50 is mounted on the lead screw 28, there is an annular space 62 between the threads on the lead screw 28 and the surface of the unthreaded portion 60 of the bore 56. This annular space 62 permits the drive nut 50 to assume an orientation slightly out of alignment with the theoretically straight axis of the lead screw 28.

Specifically, as noted above, the lead screw 28 may become bowed, or, may not be parallel to the guide rods 30. These and other conditions may cause the drive nut 50 to attempt to follow a path along the screw 28 which is not along the theoretical completely straight major axis thereof. That is, the ends of the nut 50 may cant relatively as shown by the arrow 64. Both the lack of perfect mating between the threads of the screw 28 and the bore portion 58, and the annular space 62 permit the nut 50 to become so canted. If canting or bowing is extreme, the threads of the lead screw 28 contact the walls of the unthreaded bore portion 60 to limit such canting, thus obviating the nut 50 from "freezing" on the lead screw.

At an intermediate point on the exterior of the cylindrical body 54 there is formed a shoulder 66 which performs a function to be described subsequently.

Formed at the end 68 of the cylindrical body 54 which corresponds to the outside end of the threaded portion 58 is an annular enlargement 70. A pair of diametrically opposed projections 72 is formed on the inside end of the enlargement 70, near, but away from the body end 68, which permit the mounting of the drive nut 50 to the carriage 16 via the mounting facilities 52. The projections 72 are mounted on a first diameter $D_1$ of the bore 56. As shown, each projection 72 contains a pair of opposed lugs 74 which extend parallel to the major axis of the bore 56.

Also mounted on a second diameter $D_2$ of the bore 56 at the outside end of the enlargement 70 as well as at the body end 68 is an elongated arm 76. The arm 76 may be mounted to the circumference of the enlargement 70 at any angular position $\theta$ intermediate and projections 72, the equidistant ($\theta = 90°$) mounting shown being preferred. As described in greater detail below, the arm 76 may be either relatively stiff or somewhat flexible and spring-like. The arm 76 carries on its extremity a key 78 having any convenient form such as the pin-like form shown. The key points toward the unthreaded portion 60 of the cylindrical body 54 and extends away from the arm 76 in that direction generally parallel to the major axis of the bore 56.

As best seen in FIG. 5, the arm 76 and the projections 72 are offset along the axis of the bore 56 by a distance T. The purpose of this offset T will be described shortly.

The entire drive nut 50 may be made of any low friction, long-wearing material such as those sold under the names nylon, Delrin, Teflon, Valox, or the like and is preferably formed as a single piece by a molding operation, as is well known.

MOUNTING FACILITIES

Referring again to FIGS. 2–4 the mounting facilities 52 on the carriage 16 which permit appropriate mounting of the drive nut 50 thereto are now described in detail.

The carriage 16 is generally shaped as an open-ended box, as shown, opened at 80 and may be formed in one piece of a suitable plastic in a molding operation. In the case of the high speed dot matrix printer 10, it is immediately above the opening 80 of the carriage 16 that the print head 14 is mounted. The lead screw 28 passes through opposed right-hand and left-hand walls 82 R and L respectively (FIG. 1) of the carriage 16, while the drive nut 50 extends into the opening 80 through the right-hand wall 82R.

A hole 84 is formed in the left-hand wall 82L. This hole 84 is large enough to permit the passage therethrough of the lead screw 28. A hole 86 is formed in the right-hand wall 82R which is at least large enough to accommodate that portion 88 of the cylindrical body 54 between the shoulder 66 and the projections 72. Moreover, the hole 86 is sufficiently larger than the body portion 88 to permit "floating" of the drive nut 50 in a universal radial manner due to misalignment or bowing of the lead screw 28 as more fully described below.

A chamber structure 90 is formed on the exterior of the right-hand carriage wall 82R about the hole 86. The chamber comprises two side walls, one of the side walls being the right-hand carriage wall 82R having the hold 86 therethrough. The other side wall 92 is formed on the exterior of the carriage 16 facing the wall 82R.

Formed in the side wall 92 is an aperture 94 which when viewed from the side as in FIGS. 2 or 4 has a shape complementary to, but larger than, the outline of an end view of the cylindrical body 54 including the projections 72 on the enlargement 70, as best seen in FIGS. 2 and 4. A line L drawn between the portions of the aperture 94 complementary in shape to the projections 72 is rotated from the vertical V and Diameter $D_1$ by an angle equal to $\theta/2$, here approximately 45°, for a purpose to be described below.

Next to the chamber 90 and formed on the right carriage wall 82R is a raised shoulder 96 having an elongated slot 98 therein. The elongation of the slot 98 is in a horizontal direction, the vertical dimension of the slot 98 being just large enough to accommodate the key 78. Below but contiguous to the shoulder 96 and extending to the bottom of the carriage 16 is a camming surface 100. The camming surface 100 has a thickness remote from the shoulder 96 substantially less than its thickness at the point where the surface 100 joins the shoulder 96.

MOUNTING AND OPERATION

Referring now to the exploded view of FIG. 4 there is shown the manner of mounting and using the drive nut 50 of the present invention.

First, the cylindrical body 54 is inserted through the aperture 94 into the enlarged hole 86 until the projections 72 with the lugs 74 thereon pass through the aperture 94 and two of the lugs 74 contact the right carriage wall 82R. In this orientation the key 78 is aligned with the bottom of the camming surface 100 and is rotated by $\theta/2$ away from the slot 98. The body 54 is now rotated through the angle $\theta/2$ in a clockwise direction as shown in FIG. 4. Such rotation rotates the projections 72 until the lugs 74 are trapped between the side walls 92 and 82R of the chamber 90. As the lugs 74 are so trapped they assume an essentially vertical orientation. It should be noted that the distance between the chamber side walls 82R and 92 is about the same as the thickness of the projections 72 from lug to lug. That is, consistent with ease of rotation of the body 54 during insertion of the nut 50, and consistent with the need for the nut 50 to "float" as described below, the chamber is dimensioned so as to allow only very restricted axial movement (that is, parallel to the major axis of the lead screw 28) of the nut 50 after insertion.

Simultaneously with the trapping of the lugs 74, the key 78 enters the slot 98.

In the event the arm 76 is stiff, the key 78 is cammed by the surface 100 during such rotation of the body 54 to "wobble" the entire nut 50. The distance between the walls 92 and 82R relative to the thickness of the lugs 74 is, accordingly selected to permit this movement so that the key 78 properly enters the slot 98. This assembly operation is desirable when the lead screw 28 is to be later screwed into the nut 50.

If it is desired to preassemble the nut 50 and the screw 28, the arm 76 is preferably flexible. This flexibility permits the surface 100 to flex the arm 76 just prior to entry of the key 78 into the slot 98. Such flexing is important because the "wobble" mode of assembly is not convenient due to the limited amount of skewing the nut 50 may assume on the screw 28. Of course, the flexible arm 76 may also be used in a similar manner as the stiff arm 76, as described in the preceding paragraph.

Due to the offset (T) between the arm 76 and the projections 72, the final position depicted in FIG. 2 locks the drive nut 50 to the carriage 16 in two ways. First, the drive nut 50 is locked or prevented from rotary motion in the direction of rotation of the lead screw 28 by the interfitting of the key 78 in the slot 98. Secondly, the drive nut 50 is locked from axial motion along the major axis of the lead screw 28 independent of the carriage 16 by trapping the lugs 74 in the chamber 90 and by trapping the side wall 92 between the projections 72 and the arm 76. The nut 50 is free, however, to "float." Specifically, due to the presence of a predetermined circumferential clearance between the annular enlargement 70 and the aperture 94, the nut 50 is free to assume an infinite number of positions at right angles to the theoretical axis of the lead screw 28. The key 78 is free to slide within the slot 98 and acts as a sliding pivot for this universal floating of the nut 50.

Before the lead screw 28 is threaded into the nut 50 a coil spring 102 is placed either over the cylindrical body 54 (where the nut-carriage assembly is followed by nut-screw assembly, and the arm 76 is either stiff or flexible) or over the screw 28 and the body 54 (where nut-screw assembly precedes nut-carriage assembly). The ends of the spring 102 are so dimensioned that one end thereof rests against the shoulder 66 while the other end of the spring rests against the inside of the left carriage side wall 82L. The spring 102 is chosen so that it normally urges two of the lugs 74 against the interior of the side wall 92. Referring again to FIG. 1, it may be seen that the spring 102 thus urges the drive nut 50 in the same direction as that taken by the carriage 16 as it is moved by rotation of the lead screw 28 from left to right. That is to say, as the lead screw 28 rotates it pulls the nut 50 along which in turn pulls the carriage 16 along while the spring 102 maintains two of the lugs 74 against the interior of the side wall 92. If, during left-to-right motion of the carriage 16, the printer 10 is operated in a step-by-step mode, the spring 102 tends to maintain the lugs 74 against the side wall 92 notwithstanding the periodic variations in the forces on the carriage 16 as it is accelerated and decelerated by periodic lead screw rotation. Thus, forces which might otherwise tend to make the carriage 16 "bounce" during such step-by-step operation are damped out and dissipated by the coil spring 102.

To return the carriage 16 to the start-of-line position, the lead screw 28 is rotated in an opposite direction thus pulling the carriage 16 back toward the left. Such pulling tends to pull two of the lugs 74 into contact with the exterior of the right carriage side wall 82R. This movement, of course, is against the action of the coil spring 102 but may be tolerated due to the fact that on the return stroke printing does not usually take place. Upon return to the start-of-line position, and an instant before resuming printing, the coil spring 102 urges the lugs 74 against the side wall 92.

Should the lead screw 28 be bowed or should the lead screw 28 and the guide rods 30 not be parallel, the drive nut 50 floats as previously described. Specifically, it may be seen that both the aperture 94 and the enlarged hole 86 are sufficiently large to permit universal positioning of the drive nut 50 with respect to the theoretical straight major axis of the lead screw 28. That is to say, should the lead screw 28 be bowed or misaligned, the carriage 16 is perfectly free to continue its motion as dictated by the guide rods 30 while the nut 50 moves to accommodate such bowing or misalignment. Stated another way, the drive nut 50 is free to float in a direction along any radii drawn from the center of the key 78 at any of the key's positions within the slot 98 due to lead screw bowing or misalignment.

It should be again noted that not only is the key 78 free to slide within the slot 98, but also any rotary motion or floating of the drive nut 50 within the aperture 94 and the enlarged hole 86 uses the key 78 as a pivot point. Of course, the position of the key 78 within the slot 98 is not fixed and may constantly change. The clearances between the lugs 74 and the side walls 82R and 92 on the one hand, and the enlargement 70 and the aperture 94 on the other hand is also such that the nut may assume a skewed position with respect to the lead screw axis, as previously described. In this case, one or more of the lugs 74 may act as a pivot for such skewing.

Although certain embodiments of the invention have been shown in the drawings and described in this specification it should be understood that the invention is not limited thereto and is capable of modification. Moreover, this invention may be arranged differently than as depicted without departing from the spirit and scope thereof.

What is claimed is:

1. A drive mechanism for converting rotational movement of a threaded lead screw into linear movement of a carriage along the lead screw's axis, the drive mechanism comprising:
    an elongated body having a central bore therethrough, the bore being partially threaded complementarily to the lead screw, unthreaded portions of the bore being sufficiently large to permit the body to be skewed relative to the lead screw;

means for mounting the body to the carriage for linear movement thereof with linear movement of the body parallel to the lead screw axis and for permitting universal floating of the body at right angles to the lead screw axis; and means for preventing rotary motion of the body about the axes of the lead screw and the bore.

2. The drive mechanism of claim 1 wherein the mounting means comprises:

a pair of diametrically opposed projections on the exterior of the body and coinciding with a first diameter of the bore; and a pair of opposed walls on the carriage which capture the projections therebetween to limit relative movement of the body and the carriage parallel to the axis of the lead screw and to permit movement of the projections at right angles to the lead screw axis.

3. The drive mechanism of claim 2 wherein the preventing means comprises:

an arm attached to the body and extending away from the bore along a second diameter of the bore displaced from the first diameter;

a key formed on the arm remote from the body; and an elongated slot formed in the carriage which retains the key and permits sliding of the key therein along the second diameter whereby the universal floating of the body is about the lead screw axis with the key acting as a sliding pivot point.

4. A drive mechanism for converting rotational movement of a threaded lead screw into linear movement of a carriage along the lead screw's axis, the drive mechanism comprising:

an elongated body having a central bore therethrough, the bore being partially threaded complementarily to the lead screw from one end of the body, unthreaded portions of the bore being sufficiently large to permit the body to be skewed relative to the lead screw;

a pair of diametrically opposed projections on the exterior of and near the one body end and coinciding with a first diameter of the bore;

an arm attached to the one body end and extending away from the bore along a second diameter of the bore angularly displaced from the first diameter;

means for restraining the arm to prevent rotary motion of the body about the major axes of the lead screw and the bore; and means for mounting the projections to the carriage for linear movement thereof with linear movement of the body parallel to the lead screw axis and for permitting universal floating of the body at right angles to the lead screw axis.

5. The drive mechanism of claim 4 wherein the restraining means comprises:

a key formed on the arm and remote from the body; and an elongated slot formed in the carriage which retains the key and permits sliding of the key therein along the second diameter.

6. The drive mechanism of claim 5 wherein the mounting means comprises:

a pair of opposed walls on the carriage which capture the projections therebetween to limit relative movement of the body and the carriage parallel to the axis of the lead screw and to permit movement of the projections at right angles to the lead screw axis, whereby the universal floating of the body is about the lead screw axis with the key acting as a sliding pivot point.

7. The drive mechanism of claim 6 wherein the arm is offset from the projections along the major axis of the bore.

8. The drive mechanism of claim 7 which further comprises:

means for normally urging the projections against one of the opposed walls and for damping out forces generated by discontinuous movement of the carriage in response to discontinuous rotation of the lead screw.

9. The drive mechanism of claim 8 wherein the urging means comprises:

a shoulder formed on the exterior of the body; and a spring acting between the carriage and the shoulder.

10. The drive mechanism of claim 9 wherein the spring comprises:

a coil spring coaxially mounted on the body.

11. The drive mechanism of claim 4 wherein the mounting means comprises:

a pair of opposed walls on the carriage which capture the projections therebetween to limit relative movement of the body and the carriage parallel to the lead screw axis and to permit movement of the projection at right angles to the lead screw axis.

12. The drive mechanism of claim 11 wherein the restraining means comprises:

a key formed on the arm and remote from the body; and an elongated slot formed in the carriage which retains the key and permits sliding of the key therein along the second diameter, whereby the universal floating of the body is about the lead screw axis with the key acting as a sliding pivot point.

13. The drive mechanism of claim 12 wherein the arm is offset from the projections along the major axis of the bore.

14. The drive mechanism of claim 13 which further comprises:

means for normally urging the projections against one of the opposed walls and for damping out forces generated by discontinuous movement of the carriage in response to discontinuous rotation of the lead screw.

15. The drive mechanism of claim 14 wherein the urging means comprises:

a shoulder formed on the exterior of the body; and a spring acting between the carriage and the shoulder.

16. The drive mechanism of claim 15 wherein the spring comprises:

a coil spring coaxially mounted on the body.

* * * * *